Sept. 28, 1937. M. A. PALMER ET AL Re. 20,521

ROCK DRILLING MECHANISM

Original Filed July 1, 1936

Inventors
MARK A. PALMER
MARK A. PALMER JR
by Kenway & Witter
Attorneys

Reissued Sept. 28, 1937

Re. 20,521

UNITED STATES PATENT OFFICE 20,521

ROCK DRILLING MECHANISM

Mark A. Palmer and Mark A. Palmer, Jr., Graniteville, Mass.

Original No. 2,082,418, dated June 1, 1937, Serial No. 88,321, July 1, 1936. Application for reissue July 31, 1937, Serial No. 156,830

12 Claims. (Cl. 255—49)

This invention relates to the art of rock drilling and more particularly to a new and improved device for laying and removing the dust formed in the drilling operation. It is well known that such dust if allowed freely to escape so contaminates the air as seriously to affect the health of the operator. Various devices have been proposed to allay this trouble some of which use water spray for laying the dust and washing it away. The primary object of our invention is the production of an improved and relatively simple and more convenient device for this purpose.

The invention is particularly applicable to the drilling of granite wherein large slabs are removed from the main rock body by drilling and wedging. In such operations a mark is drawn along the line on which the stone is to be split, holes are drilled into the rock along this line and wedges are then driven in to split off the slab along this line. Our invention embodies a ring-like member adapted to rest on the rock and be moved freely along this line. The member has a centrally disposed opening for receiving the drill bit and is cored out to provide a water chamber disposed around the opening. A hose connection to and spray holes from the chamber provide for such application of water to the hole being drilled as to allay and wash away the dust as it is formed and without permitting its escape into the air. The spray is preferably directed downwardly into the hole being drilled and the member is preferably provided with means for spacing it from the rock whereby permitting the wash water to escape, such means also forming a wear-taking reenforcement for the base portion of the member. Further features of the invention reside in the employment of a bushing within the ring-like member for taking the wear of the drill, this bushing preferably being removable and replaceable, and in an anti-splash unit of rubber or like flexible material surrounding the drill bit adjacent to the outer face of the member whereby to prevent upward splashing of the water as the hole is being drilled.

Figure 1:
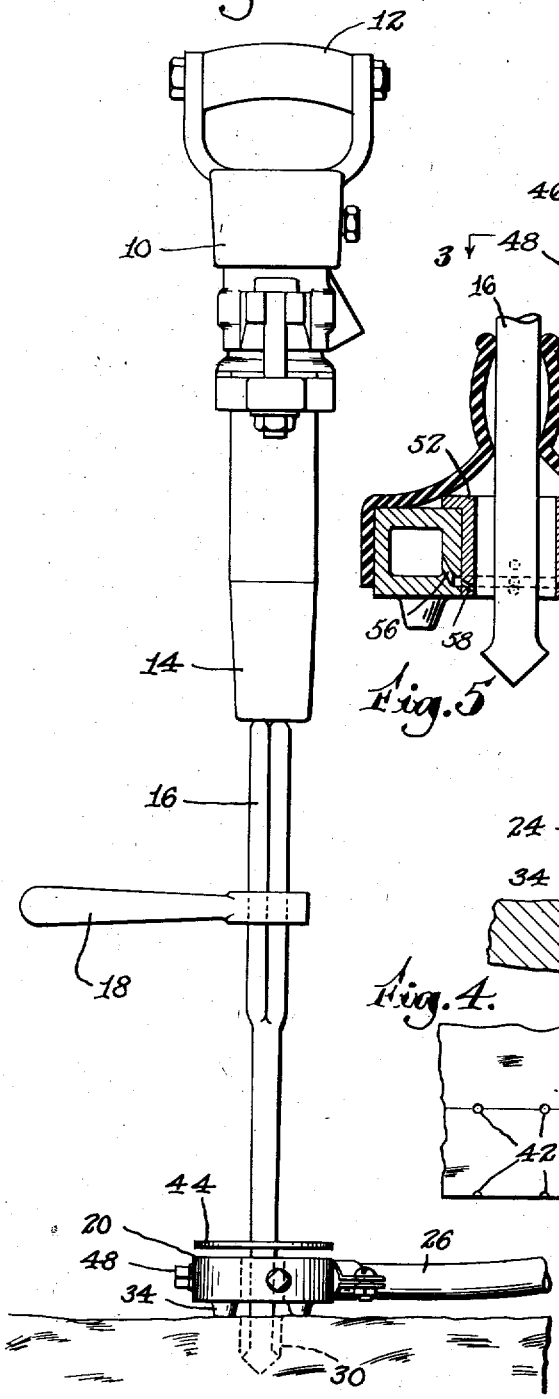
Figure 2:
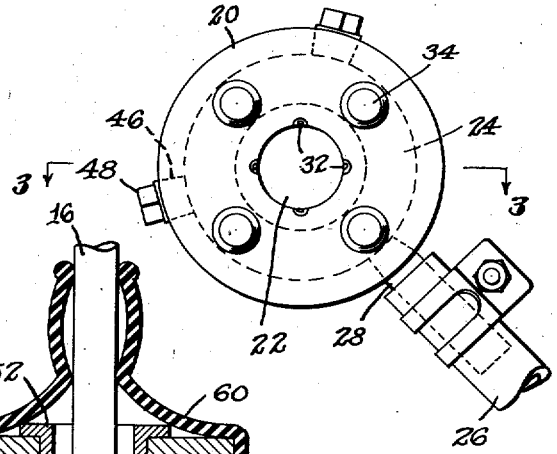
Figure 5:
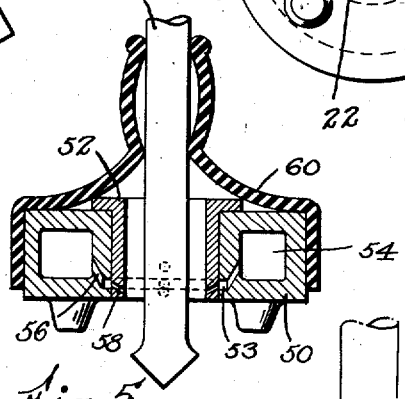
Figure 3:
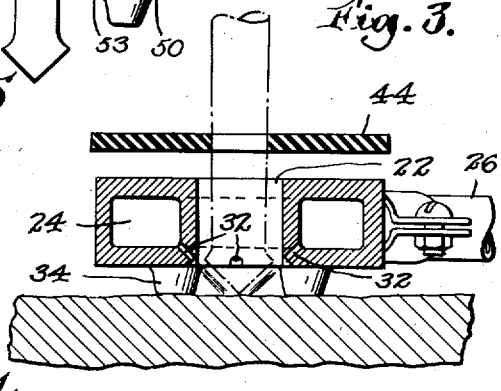
Figure 4:
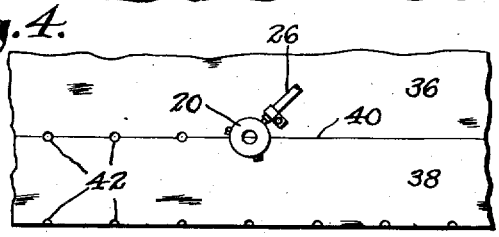

These and other features of the invention will be best understood and appreciated from a preferred embodiment thereof, selected for purposes of illustration and shown in the accompanying drawing in which, Fig. 1 is an elevation of a rock drill employing the dust laying and removing device of our invention, Fig. 2 is a bottom plan view of the device, Fig. 3 is a fragmentary sectional view taken on line 3—3 of Fig. 2, Fig. 4 is a fragmentary plan view of a rock being drilled, Fig. 5 is a view like Fig. 3, but showing a modified construction.

In the drawing 10 indicates a pneumatic drill of standard construction having a handle 12 and a bit-receiving socket 14. A bit 16 carried in the socket is pneumatically vibrated longitudinally by the drill in the usual manner and may be manually rotated by a handle 18.

The dust laying and removing device of our invention consists of a ring-like member 20 having a drill-receiving hole 22 therethrough and cored out at 24 to provide a water reservoir or chamber, the member preferably being of annular construction and the water chamber preferably being continuous. Water is provided to the chamber through a hose 26 and hose connection 28. In use the member rests on the rock being drilled and the bit is projected therethrough as shown in the drawing. The impacts of the bit reduce the rock to dust form thereby forming the hole 30. The object of the invention is to prevent the escape of this dust into the air and such object is accomplished by relatively fine sprays or jets through the perforations 32 extending into the chamber 24, these perforations preferably being directed inwardly and downwardly whereby to project sprays into the hole being formed. Such hole is in alignment with the opening 22 during the drilling operation and it will be apparent that in accordance with the invention the sprays or jets are projected into the drill-receiving alignment of the opening 22 either directly within such opening or outwardly of one face of the member as illustrated in Fig. 3. Lugs 34 are also preferably provided on the member whereby to space the same from the rock and permit the wash water and dust contents to flow freely from the hole.

In Fig. 4 we have illustrated in fragmentary plan view a rock 36 wherein a slab 38 is being split therefrom in accordance with the practice in granite quarries. A line 40 is drawn on the rock along which it is desired to split and a series of holes 42 is then drilled in spaced relation along this line, the slab thereafter being split off by wedges driven in on the line. Our invention is particularly applicable to work of this nature, since in such use the member 20 simply rests loosely on the rock, as illustrated in Figs. 1 and 4. The operator places the drill bit 16 through the opening 22 and in contact with the point on the line 40 where it is desired to drill a hole 42. After the completion of each hole, the operator merely withdraws the drill from the hole, without withdrawing the drill from the opening 22, he moves the member 20 to the next position, continuing thus along the line until the series of holes has been completed. It will be quite apparent that such operation is extremely simple and rapid.

While the drilling is in progress, water under pressure is flowed into the chamber 24 and outwardly through the perforations 32 and, since these perforations are directed downwardly toward the center of the hole, the dust formed by the drilling is laid as it is formed and immediately removed by the water overflow from the hole, the spacing of the member from the rock by means of the lugs 34 facilitating this overflow. Attention is particularly called to the fact that the member 20 is centered by the drill bit and must therefore remain in proper position over the hole. Also cooperating with the drill and member 20 is a unit 44 surrounding the drill bit adjacent to the outer face of the member. The purpose of this unit is to prevent upward splashing of the water due to the impacts of the drill. The unit is preferably made of resilient material whereby causing close and elastic engagement thereof with the drill bit.

In Fig. 5 we have illustrated a modified form of our invention which may be preferable under some conditions. The member 50 of this form is similar to the member 20 except that it includes a bushing 52 seated within the central opening through the member 50. An annular channel 53 is provided within this opening and is in communication with the chamber 54 through a plurality of ports 56. The bottom end of the bushing is provided with a plurality of spray holes 58 which are in communication with the channel 53 in all rotary positions of the bushing, the sprays or jets in this case being illustrated as directed into the opening in the bushing and somewhat downwardly onto the drill. The bushing may serve various purposes among which is particularly mentioned the convenient and economical substitution of a new bushing, without requiring a new member 50, when the bushing has become worn by the action of the drill therein. The spray holes and the member 50 may also be very easily cleaned by removing the bushing and cleaning the bushing and member separately.

It will be apparent that the device comprising the invention may be constructed in one piece as illustrated in Figs. 1–3, or in a plurality of pieces as illustrated in Fig. 5. In either case however the elements 20 and 50 are each preferably of one-piece construction and each may be conveniently and economically formed as a casting. The chambers 24 and 54 are preferably relatively large and continuous whereby to provide for an ample flow of water and feed the same uniformly to the spray perforations. The large and continuous chambers 24 and 54 furthermore eliminate possible clogging of the water supply and facilitate the cleaning of the chamber and the openings thereinto. Such cleaning may be further facilitated by additional holes 46 into the chamber, and normally closed by plugs 48. The anti-splash unit may be constructed to engage the bit, the members 20—50, or both. In Fig. 5 the unit is in the form of a hood 60 and engages both the bit and member 50. The upper portion of this unit is preferably shaped to have line contact with the bit at one or more places instead of having a surface contact therewith, thus facilitating movement of the bit therethrough. The flexibility of the unit 60 permits considerable impact movement of the bit without requiring any relative movement of the bit at the lines of contact. It should now be apparent that we have produced a relatively simple and improved apparatus of the nature and for the purpose described.

It will be understood that the granite formations are such that the splitting-off plane 40 may be vertical, horizontal or at any angle therebetween. In all cases the pneumatic vibrations of the drill cause a considerable chattering movement of the member 20 on and about the drill and results in heavy wearing of the member at its point of support. When drilling on substantially horizontal surfaces this wearing movement is between the base of the member 20 and the relatively rough granite. The lugs 34 provide a reinforcement to the base portion of the member whereby absorbing this wear and leaving its body portion and the chamber 24 intact, it being apparent that otherwise the base wall would wear through into the chamber 24 and destroy the device. When drilling on surfaces relatively angular to the horizontal, the member 20 rests on the drill and the wearing movement is between the drill and the wall of the opening 22. The chattering movement of the member in such cases causes heavy wearing away of the portion of this wall located above the point of connection of the hose 26 (Fig. 2). The provision of a plurality of holes 46 into the chamber 24 provides for connecting the hose at different positions around the member whereby changing its position of support on the drill. The useful life of the device is thereby lengthened and the annular configuration of the opening 22 more nearly maintained.

Having thus described our invention, what we claim as new and desire to secure by Letters Patent of the United States is:—

1. A dust laying and removing device for use with rock drills, comprising a ring-like member including a bushing having a drill-receiving opening therethrough and a portion supporting the bushing and having its interior cored to provide a water chamber extending about the opening, the bushing having a plurality of relatively small spray holes positioned to direct water jets into the opening and said portion having port communication from said chamber to said holes, and a hose connection to the chamber.

2. A dust laying and removing device for use with rock drills, comprising a ring-like member including a bushing having a drill-receiving opening therethrough and a portion supporting the bushing and having its interior cored to provide a water chamber extending about the opening, the bushing having a plurality of relatively small spray holes positioned to direct water jets into the opening and said portion having port communication from said chamber to said holes and including an annular channel at the junction of the bushing with said portion, and a hose connection to the chamber.

3. In a rock drilling device, a ring-like member having a drill-receiving opening through the center thereof and having its interior cored to provide a water chamber extending about the opening, the member having water communication including a plurality of relatively small spray holes arranged to direct water jets from the chamber into the drill-receiving alignment of said opening, a hose connection to the chamber, a drill bit extending into the opening, and an anti-splash unit surrounding the bit adjacent to the outer face of the member.

4. In a rock drilling device, a ring-like member having a drill-receiving opening through the center thereof and having its interior cored to provide a water chamber extending about the opening, the member having water communication including a plurality of relatively small spray holes arranged to direct water jets from the chamber into the drill-receiving alignment of said opening, a hose connection to the chamber, a drill bit extending into the opening, and an anti-splash unit surrounding the bit and member and in fitting contact with both and providing a hood adjacent to and covering the outer face of the member.

5. A dust laying and removing device for use with rock drills, comprising an annular member having a drill-receiving opening therethrough and having its interior cored to provide a relatively large water chamber extending about the opening, three or more relatively spaced lugs carried by and projecting beyond one face of the member in position independently to support the member on and in spaced relation to a rock to be drilled, the member having water communication from the chamber to the opening and including a plurality of relatively small spray holes arranged to direct water jets from the chamber inwardly of the opening and outwardly of one end thereof and of said face of the member, said lugs being adapted to support the member independently of the drill and said opening being adapted to receive the drill loosely therethrough while the member is thus supported, and a hose connection to the chamber.

6. A dust laying and removing device for use with rock drills, comprising an annular member having an opening therethrough and having a hollow interior providing a water chamber extending about the opening, the member having water communication from the chamber to the opening and including a plurality of relatively small spray holes in position to direct water jets from the chamber inwardly of the opening, means carried by the member and extending a relatively short distance beyond one face thereof for independently supporting the member on and in spaced relation to a rock to be drilled, said means being adapted to support the member independently of the drill and said opening being adapted to receive the drill loosely therethrough while the member is thus supported, and a hose connection to the chamber.

7. A dust laying and removing device for use with rock drills, comprising an annular member having a drill-receiving opening through the center thereof and having its interior cored to provide a relatively large and continuous water chamber surrounding the opening, three or more relatively spaced lugs carried by the member and projecting beyond one face thereof a distance less than the thickness of the member and adapted to support the member in spaced relation on a rock to be drilled, the member having water communication including a plurality of relatively small spray holes in position to direct water jets from the chamber into the drill-receiving alignment of said opening, said lugs being adapted to support the member independently of the drill and said opening being adapted to receive the drill loosely therethrough while the member is thus supported, and a hose connection to the chamber.

8. A dust laying and removing device for use with rock drills, comprising a substantially annular member having a drill-receiving opening therethrough and having its interior cored to provide a water chamber extending about the opening, the member having water communication including a plurality of relatively small spray holes in position to direct water jets from the chamber into the drill-receiving alignment of the opening, and a hose connection to the chamber, the member being adapted to hang loosely on a substantially horizontal drill adjacent to the bore hole of a rock being drilled with the hose connection lowermost and the drill extending through said opening, whereby to wash the rock dust away as it is formed in the drilling operation.

9. The device defined in claim 8 wherein said member has a plurality of hose connection holes in relatively spaced relation through its outer wall and extending into the chamber, and removable plugs filling said holes.

10. A dust laying and removing device for use with rock drills, comprising a ring-like member including a bushing having a drill-receiving opening therethrough and a portion supporting the bushing and having its interior cored to provide a water chamber extending about the opening, the device having water communication including a plurality of relatively small spray holes positioned to direct water jets from the chamber outwardly of one face of the device and in directions converging inwardly toward the drill-receiving axis of said opening, and a hose connection to the chamber.

11. A dust laying and removing device for use with rock drills, comprising a substantially annular member having a drill-receiving opening therethrough and having its interior cored to provide a water chamber extending about the opening, the member having water communication including a plurality of relatively small spray holes positioned to direct water jets from the chamber into the drill-receiving alignment of said opening, means carried by the member and extending a relatively short distance beyond one face thereof for independently supporting the member on and in spaced relation to a rock to be drilled and providing a wear-resisting support for the member, said means being adapted to support the member independently of the drill and said opening being adapted to receive the drill loosely therethrough while the member is thus supported, and a hose connection to the chamber.

12. A dust laying and removing device for use with rock drills, comprising a substantially annular member having a drill-receiving opening therethrough and having a hollow interior providing a water chamber extending about the opening, means carried by the member and extending a relatively short distance beyond one face thereof for independently supporting the member on and in spaced relation to a rock to be drilled and providing a wear resisting support for the member, said means being adapted to support the member independently of the drill and said opening being adapted to receive the drill loosely therethrough while the member is thus supported, the device having water communication including a plurality of relatively small spray holes positioned to direct water jets from the chamber outwardly of said one face of the member and in directions converging inwardly toward the drill-receiving axis of said opening, and a hose connection to the member.

MARK A. PALMER.
MARK A. PALMER, JR.